Figure 1:
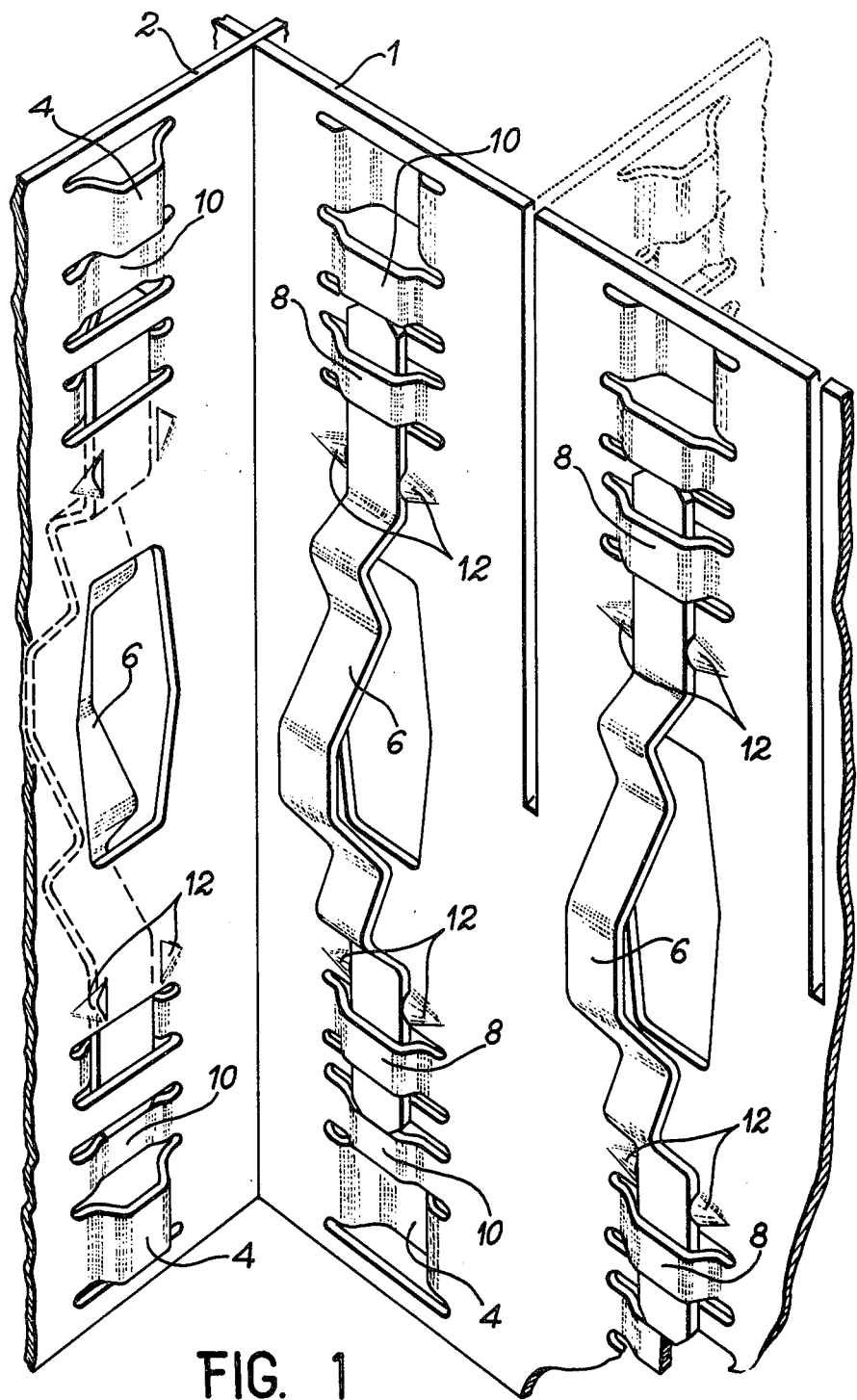

United States Patent [19]

Feutrel

[11] 4,364,902

[45] Dec. 21, 1982

[54] DEVICE FOR FIXING A SPRING TO A SPACING GRID FOR FUEL ELEMENTS OF NUCLEAR REACTORS

[75] Inventor: Claude Feutrel, Vauhallan, France

[73] Assignee: Commissariat a l'Energie Atomique, France

[21] Appl. No.: 181,704

[22] Filed: Aug. 27, 1980

[30] Foreign Application Priority Data

Sep. 6, 1979 [FR] France .............................. 79 22311

[51] Int. Cl.³ .............................................. G21C 3/34
[52] U.S. Cl. .................................... 376/441; 376/442; 376/448
[58] Field of Search ............... 376/438, 441, 446, 448, 376/442

[56] References Cited

U.S. PATENT DOCUMENTS 3,679,546  7/1972  Muellner ............................ 376/441
3,769,159  10/1973  Zinn .................................... 376/438
4,221,636  9/1980  Feutrel ............................... 376/441

Primary Examiner—Donald P. Walsh

[57] ABSTRACT

The present invention relates to a device for fixing a spring to a spacing grid for fuel elements of nuclear reactors.

This device is characterized in that it is constituted by two retaining bridges (8) for the spring (6) made in one of the thin metal sheets constituting the grid and maintaining the spring (6) against said sheet. Two other bridges (10) located outside the bridges (8) constitute abutments for stopping the translation of the spring (6). A double stamping (12) made in the thin metal sheet at the approaches of each retaining bridge (8) constitute a precise translation guide for the spring (6).

Application to the spacing grids of fuel elements of nuclear reactors.

3 Claims, 2 Drawing Figures

DEVICE FOR FIXING A SPRING TO A SPACING GRID FOR FUEL ELEMENTS OF NUCLEAR REACTORS

The present invention relates to a device for fixing a spring to a spacing grid for fuel elements of nuclear reactors.

The function of such grids is to space a group of sheathed nuclear fuel elements in a nuclear reactor assembly. These elements must be kept parallel to one another and in accordance with a given system, whilst also ensuring an elastic bearing of said elements in accordance with different successive regions distributed in accordance with their length. This more particularly serves to prevent vibration thereof under the effect of the circulation of a liquid cooling medium flowing in contact therewith.

Numerous constructions of spacing grids of the type described hereinbefore are known and these are in particular constituted by means of an arrangement formed by two groups of perforated thin metal sheets, which are respectively parallel in each group and are perpendicular between one group and the next. These sheets are grooved at regular intervals so as to permit their fitting together and in this way define cavities having a square cross-section, each being traversed by one element of the group. In order to ensure the requisite elastic bearing on said elements, the sheets are appropriately cut and fitted in such a way that towards the interior of each cavity they have relief bosses and tongues forming springs. Each fuel element in a cavity being applied by a spring or two fixed supports provided on one of the sheets under the action of the tongue forming a spring provided in the opposite parallel sheet.

Such a construction of spacing grids for nuclear reactor fuel elements is described in detail in French Pat. No. 79,13016 filed on May 22, 1979 in the name of the Commissariat à l'Energie Atomique and entitled "Device for fixing a spring to a spacing grid for nuclear reactor fuel elements and method for installing springs in such a fixing device".

Another embodiment of a spacing grid is described in French Pat. No. 2,397,042 filed on July 7, 1977 in the name of the Commissariat à l'Energie Atomique and entitled "Spacing grid for a group of fuel rods in a nuclear reactor assembly". This grid has tongues forming springs having a zig-zag profile and projecting into two adjacent cavities. The grid sheet has large recesses to permit the passage of the projecting bosses of the tongue forming the spring. For this type of grid the ends of the tongues can slide freely as a result of the forces exerted by the fuel elements.

The present invention relates to a device for fixing a spring to a spacing grid for the fuel elements of nuclear reactors which has a simple construction and which reliably secures the fuel elements. In particular, the device according to the invention ensures a precise lateral guidance of the holding springs.

The present invention more specifically relates to a device for fixing a spring to a spacing grid for the fuel elements of a nuclear reactor, said spring being elongated and each of the nuclear fuel elements is held by at least one spring against at least one rigid support formed in the wall of a cavity traversed by the fuel element, the cavities being formed by the intersection of two groups of thin metal sheets which are respectively parallel in each group and perpendicular from one group to the next, the assembly of two groups of thin sheets constituting the grid, wherein the device is constituted by two retaining bridges for the spring made in one of the thin sheets constituting the grid maintaining the spring against the thin sheet, two other bridges external of the retaining bridges constituting abutments for stopping the spring in translation, a double stamping made in the thin sheet at the approaches of each retaining bridge constituting a precise translation guide for the spring.

The fixing device according to the invention has a constructional variant in the case of peripheral plates of the retaining grid. Thus, there are two peripheral sheets in the gap separating the fuel elements located on the border of two adjacent grids. As the spacing between the fuel elements is constant throughout the core assembly, it is necessary to take account of the thickness of the supplementary sheet. To this end, the device for fixing a spring to a peripheral plate of a spacing grid for nuclear reactor fuel elements is characterized in that the retaining bridges are constituted by two tongues which can be folded down after fitting the spring, whilst at least one slot whose width is equal to that of the spring and made in the thin sheet in the longitudinal axis direction of the spring guiding the latter in translation in a precise manner.

The invention will be better understood from reading the following description of a non-limitative exemplified embodiment, with reference to the attached drawings, wherein show:

FIG. 1 a perspective view of the fixing of the spring to the metal sheets constituting a spacing grid for nuclear reactor fuel elements by means of a device according to the invention.

Figure 2:
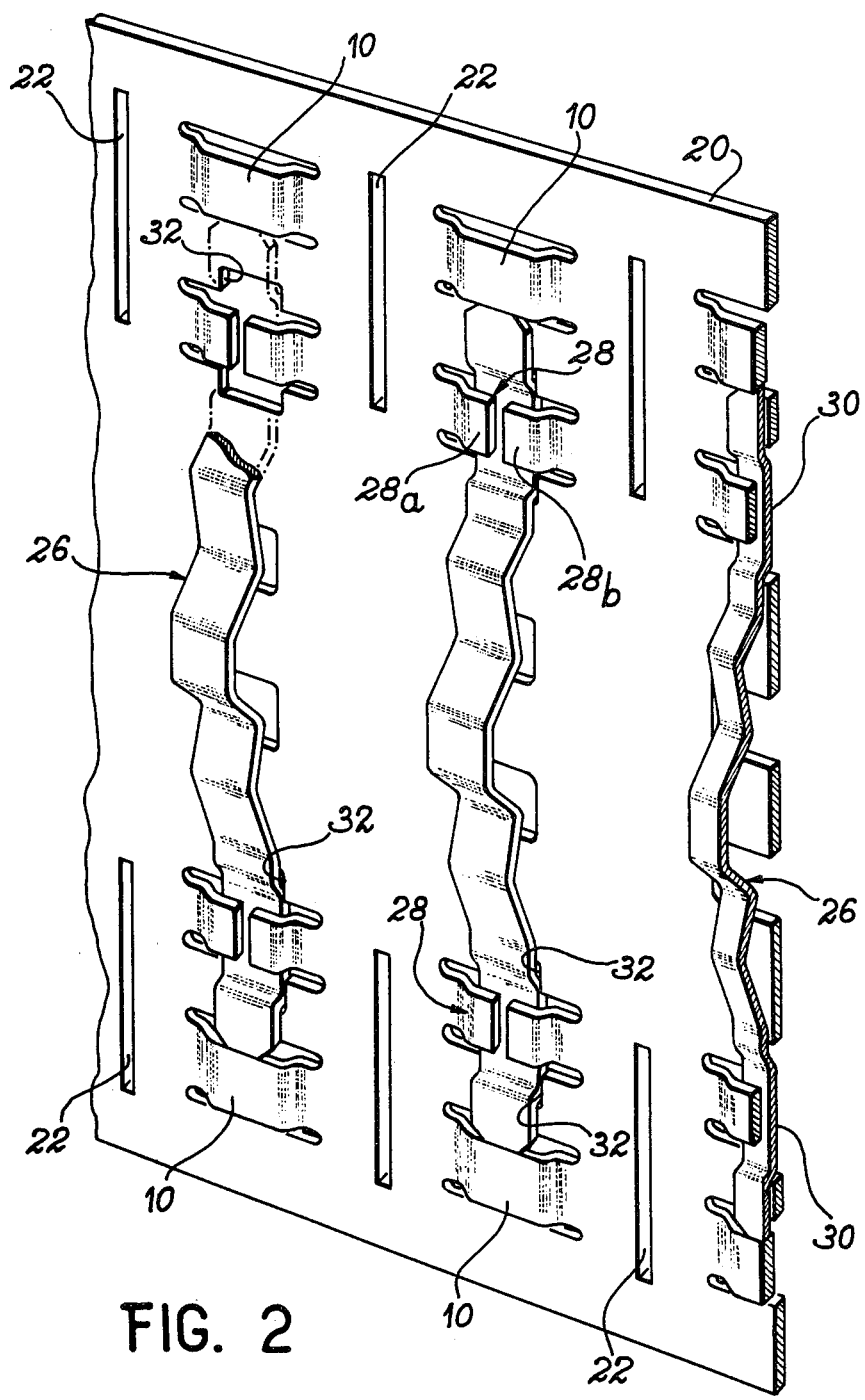

FIG. 2 a constructional variant of the device according to the invention adapted to a peripheral plate of a fuel element spacing grid.

It is known that a stream of cooling water flows over the fuel elements constituting the core of a nuclear reactor, particularly a pressurized water reactor. For this reason, these fuel elements are kept at regular intervals by spacing grids. Such spacing grids have an outer frame formed by side plates joined to one another by their contacting ends by means of weld points or any other appropriate means. Two groups of metal sheets are located within the frame formed by the side plates. These sheets are parallel to one another in one group and perpendicular to one another between one group and the next in such a way that they define a series of cavities in which engage the fuel elements.

FIG. 1 shows such transverse sheets 1 and 2, which are perpendicular to one another and define a series of cavities in which engage the fuel elements not shown in the drawing. Within each cavity, there are rigid bosses such as 4 against which the fuel elements permanently bear due to the force exerted by the holding spring fixed to the wall of the cavity opposite to the bosses 4. These holding springs are designated by 6 in FIG. 1. Spring 6 is engaged by each of its ends in a bridge 8, called the retaining bridge which is formed in the thickness of the thin sheets such as 1 and 2 of the grid. Externally of the retaining bridges 8 are located bridges 10 which are also made in the thin sheet defining the cavity, said bridges 10 constituting abutments for stopping the translation of the spring 6.

An important feature of the fixing device according to the invention is constituted by the lateral guidance of the spring. The functions of maintaining the spring 6 against the metal sheet constituting the cavity wall and its lateral guidance are carried out separately. For this purpose, there is a double stamping 12 in the thin sheet in the vicinity of each of the retaining bridges 8. This arrangement makes it possible to guide the spring 6 over its entire thickness between two faces which are parallel to the plane of the latter. Thus, spring 6 is more accurately guided. A means such as 8 necessarily has rounded angles and consequently is unable to guide spring 6 over its entire thickness.

Another important feature is constituted by the fact that the ends of tongue 6 abut against bridges 10. These abutments balance the forces exerted by the fuel element.

A spring such as 6 is installed within the fixing device according to the invention in the following manner. One of the ends of spring 6 is introduced into a bridge, e.g. the upper bridge, bridge 10 constituting an abutment for stopping the translation of spring 6 not having yet been formed, so as to permit the adequate engagement of the upper end of spring 6 to permit the easy introduction of its lower end beneath the second retaining bridge 8. The lower end of spring 6 is introduced beneath the retaining bridge 8 and it is engaged by sliding until it is arrested in translation by bridge 10, the latter having been previously formed. With spring 6 in its final position, the upper bridge 10 is formed in order to immobilise it in this position.

The fixing device according to the invention has a constructional variant in the case of the peripheral plates of the fuel element retaining grid. Thus, the core of the nuclear reactor has numerous fuel elements which are kept parallel to one another by a system of similar retaining grids. There are obviously two peripheral metal sheets in the gap separating the fuel elements located at the border of two adjacent grids. As the spacing between the fuel elements is constant throughout the core, it is necessary to take account of the thickness of the supplementary sheet. FIG. 2 shows a constructional variant of the device for fixing a spring to a spacing grid for the fuel elements of a nuclear reactor according to the invention, which is adapted to the case of a peripheral plate for the retaining grid.

In FIG. 2, 20 designates a peripheral of a retaining grid. Recesses 22 are made in the thickness of sheet 20. Within these recesses 22 is engaged a series of sheets (not shown in FIG. 2) defining cavities similar to those described with reference to FIG. 1. However, as the spacing between the fuel elements is the same throughout the core, the cross-section of these cavities is rectangular and not square in order to take account of the thickness of the supplementary sheet. In order to compensate this difference, which is equal to half the thickness of the sheet, in each of the two contiguous cavities a holding spring 26 is used, which differs in its profile from the previously described spring 6. To permit an adequate bend or sag of spring 26 once the fuel element is in place, it is necessary to reduce the protruberance constituted by the retaining bridge 8 described with reference to FIG. 1. For this purpose, the holding bridge 28 for a peripheral grid plate is constituted by two tongues 28a, 28b, which can be folded down after fitting the spring 26. The thickness of bridge 28 remains partly in the profile of sheet 20. For this to be possible, spring 26 has a special shape. The longitudinal half-section of one of the three springs 26 shown in FIG. 2 makes it possible to observe this shape in marked zone 30.

Bridges 10 constituting the abutments stopping the translation of spring 26 are identical to those described relative to FIG. 1.

The spring 26 is laterally guided by the sides of slot 32 made in sheet 30. FIG. 2 shows the shape of this slot.

For fitting spring 26, there is no need for one of the two bridges 10 to be formed after the spring has been fitted, this being due to the foldable tongues 28a, 28b. Therefore, bridges 10 can be formed beforehand.

I claim:

1. A spacing grid for the fuel-elements of a nuclear reactor, said grid comprising two groups of thin metal sheets which are respectively parallel in each group and perpendicular from one group to the next, said thin sheets delimiting square section cavities, said grid further comprising, in each cavity, at least one rigid support formed in a wall of the cavity traversed by a fuel-element, and at least an elongated spring fixed to another wall of the cavity by fixing means, said spring being bow-shaped and located entirely in said each cavity, said spring holding said nuclear fuel-element against said rigid support, and said fixing means comprising two retaining bridges made in the thin sheet constituting said other wall of the cavity which is opposite said rigid support, two other bridges external of the retaining bridges constituting abutments for stopping the spring in translation, and said other wall of the cavity on which the spring is fixed also comprising means for a precise translation guiding of said spring.

2. A spacing grid according to claim 1, wherein said means for a precise translation guiding of the spring comprise a double stamping made in the thin sheet at the approaches of each retaining bridge.

3. A spacing grid, according to claim 1, wherein said grid has peripheral plates comprising retaining bridges for the spring constituted by two tongues which can be folded down after fitting the spring, and said means for a precise translation guiding of the spring being constituted by at least one slot whose width is equal to that of the spring and made in the thin sheet in the longitudinal axis direction of the spring guiding the latter in translation in a precise manner.

* * * * *